Feb. 17, 1959 — J. R. OISHEI — 2,873,467
WINDSHIELD CLEARING SYSTEM
Filed April 8, 1955 — 2 Sheets-Sheet 1

INVENTOR.
John R. Oishei
BY
Bean, Brooks, Buckley & Bean
ATTORNEYS

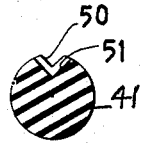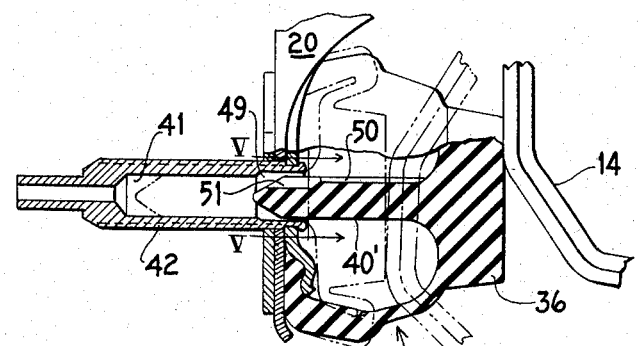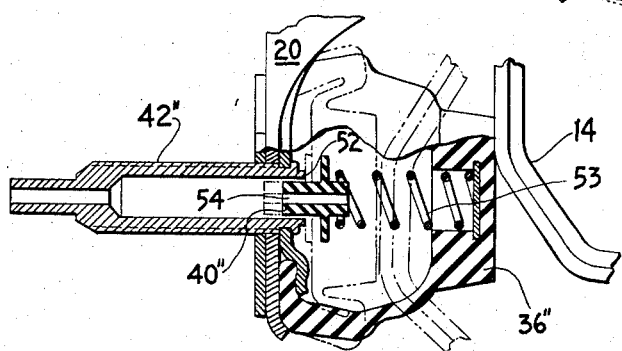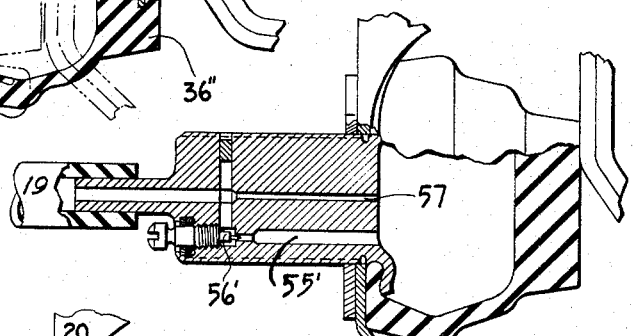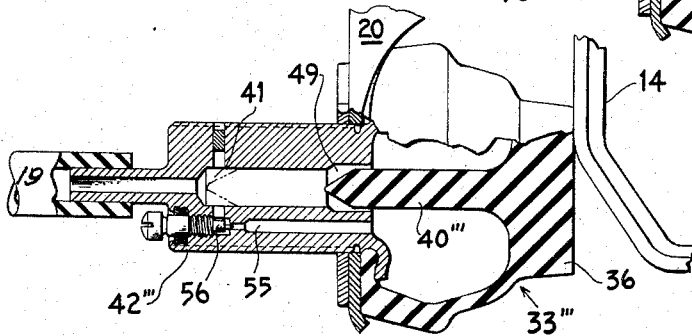

United States Patent Office 2,873,467
Patented Feb. 17, 1959

2,873,467
WINDSHIELD CLEARING SYSTEM

John R. Oishei, Buffalo, N. Y., assignor to Trico Products Corporation, Buffalo, N. Y.

Application April 8, 1955, Serial No. 500,194

16 Claims. (Cl. 15—250.4)

This invention relates to the automotive field and primarily to the windshield cleaning art wherein a liquid solvent is applied to a windshield in the path of a wiping element for maintaining a clear field of vision for safe driving.

In a copending application Serial No. 297,007, now Patent No. 2,743,473, an automatic windshield cleaner is correlated to a washing system in such a manner that when the washer is energized it will automatically cause the windshield cleaner to function, the coordinating mechanism serving to continue the wiping action subsequent to the liquid application to wipe the glass surface dry of excess moisture for clear vision therethrough. In this earlier disclosure an automatic windshield cleaner of the suction operated type is associated with a suction responsive washer, which latter, when rendered operative, will operate thorugh a coordinator unit to energize the windshield cleaner unit, the coordinator unit serving in the capacity of a time delay action to arrest the cleaner following the lapse of a time interval after the liquid application to the windshield. In a modified disclosure, a foot pressure energized washer unit is illustrated as having a mechanical connection to the windshield cleaner unit for correlated operation. In such modified embodiment, the windshield washer and cleaner control is turned on by and during lever depression and turned off by its return movement during the intake stroke of the washer pump. However this return movement is spring actuated and its time interval is of brief duration with the result that the wiping action which follows the washing cycle is insufficient to thoroughly dry the windshield surface, unless the operator continues to hold the working lever depressed.

In a later filed application Serial No. 424,376, now Patent No. 2,827,652, there is disclosed a similar lever actuated arrangement which embodies a time delay action to continue the wiping action for a definite period after the washing cycle, which period is sufficient to thoroughly dry the windshield surface.

The present invention is an improvement on these earlier disclosures and has for its object to provide an economically constructed windshield clearing system utilizing a bellows and piston combination, embodying a simplified time delay action that is operable to render the wiper unit more efficient for insuring an effective drying of the windshield surface.

Further, the invention has for its aim to provide an improved lever actuated windshield clearing system of the character described wherein the cleaner unit is initially energized early in the washing cycle and continues throughout the remainder of this cycle and substantially throughout the period in which the washer power unit is reconditioning itself preparatory for its next washing cycle.

Again, the invention will be found in a windshield clearing system wherein a lever control, common to both the washer unit and the wiper unit and operative to concurrently energize them, is automatically disconnected from the already operating wiper unit as it continues being depressed to maintain the washer action.

The foregoing and other objects will manifest themselves as this description progresses, reference being made therein to the accompanying drawings, wherein Fig. 1 is a schematic view showing the installation of the improved windshield cleaner system;

Fig. 4 is a view somewhat similar to Fig. 2 of a modified pump unit;

Fig. 5 is a detail cross sectional view through the metering stem, as viewed on line V—V of Fig. 4;

Figs. 6 and 7 are views similar to Fig. 4 of further modifications of the pump unit; and Fig. 8 is a cross section of a further modification in which there is a predetermined amount of filling resrtiction either with or without the adjustable by-pass to modify the amount of total restriction.

Figures 1, 2, 3:
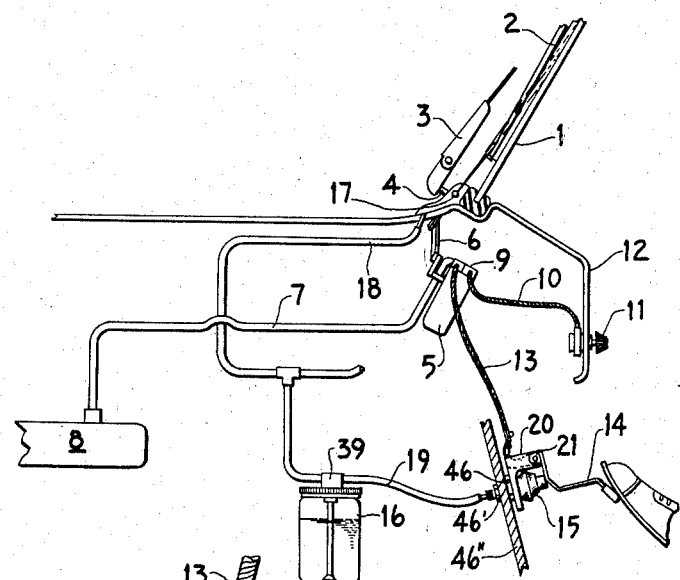
Fig. 2 is a fragmentary view, partly in section, of the pump element and its make and break connection with the cleaner control.
Fig. 3 is a detail perspective view, in fragment and partially exploded, of the pump unit.

Referring more particularly to the drawing, the numeral 1 designates the windshield of a motor vehicle across which is oscillated a wiping blade 2 by a spring pressed arm 3 that is fixed to an oscillating shaft 4 which in turn derives its power from a windshield cleaner motor 5 through a transmission linkage 6. The windshield cleaner motor may be of any suitable type, the one depicted herein being suction actuated and is therefore connected by a supply conduit 7 to a source of suction such as the intake manifold 8 of the vehicle power plant. A control valve 9 interposed in the conduit is made accessible to the motorist by a Bowden wire 10 leading to a knob 11 mounted on the instrument panel 12.

A second Bowden wire 13 connects the control valve 9 to a lever 14 which forms a part of a windshield washer system including a pump 15, a reservoir 16, a nozzle 17 and connecting conduits 18 and 19. The lever is provided with a pair of ears 21 and 22 pierced by a pivot shaft 23 for mounting the lever on a bracket 20. The ear 22 is extended to form a rocker arm to which the Bowden wire 13 is connected. The armor or sheath element of the Bowden wire is fixed upon an arm extension 25 of the bracket 20, being secured thereto by a screw 26 and washer 27. The wire element 28 of the Bowden unit is bent to form a pintle 29 for supporting collar 30 that is free to rotate and slide within an arcuate slot 31 of the rocker arm 22. This slot is formed at its upper end with an offset seat 32 into which the collar-equipped pintle 19 will spring when the lever is inactive at which time the wire element is extended from its sheath to its maximum distance, as illustrated in the full line showing of Fig. 2. In this position, the bellows unit 33 is in its normal, expanded condition. The collar 30 may be retained in place by a washer 34.

With the collar engaged in the terminal seat 32, the next depression of the lever will slide the wire element into its sheath to move the valve 9 to its open or motor energizing position. The Bowden wire is held by the bracket arm 25 in a position substantially tangential to the arcuate path of the seat 32 so that as the rocker arm 22 moves upwardly, the wire element 28 will be telescoped within its sheath but moving out of the tangential plane it will also be placed under a lateral stress sufficient to eventually displace the pintle 29 and its collar 30 from the seat 32 and automatically disconnect the lever from the wiper power unit to idly ride in the underlying arcuate portion of the slot 31 while the lever continues to be depressed for sustaining the flow of liquid solvent onto the windshield surface in the path of the now operating wiper 2. This insures an early operation of the wiper by the initial movement of the lever and thereby provides a long period of conjoint use for the washer and wiper units.

By reason of the lost motion connection afforded by the slot 31, in which the collar 30 may slide, the wiper will also remain in operation after the lever is released and until the offset terminus 32 catches the collar and distends the wire element 28 from its sheath to close the control valve 9. During the return of the lever to its idle position, at which time the washer unit is inoperative, the continued wiping action of the wiper unit will dry the windshield surface for clear vsion. By this arrangement it will therefore be obvious that the wiper action will begin almost instantaneously with the application of foot pressure to the lever and will continue throughout the remainder of the delivery stroke of the pump and then throughout the major portion of its return stroke. Since the discharge orifice of the nozzle 17 is exceedingly small, a fine stream of the liquid solvent will be delivered for a practical time interval.

The bellows or bulb 33 is preferably formed of rubber, or the like, and comprises a cup shaped base section 35, a piston-like fluid displacing section 36 and a relatively thin distensible wall section 37 connecting sections 35 and 36. The lever 14 has a bearing portion 38 slidably engaging the fluid displacing section or piston plunger 36 to depress the latter toward and into the cupped base part 35, as shown in broken lines in Fig. 2. A rapid depression of the piston plunger will subject the fluid content of the bellows to a pressure capable of causing a distension of the thinner wall 37, by means of which the spray or solvent stream will continue to be discharged from the nozzle under the restorative action of the distended wall while the motorist continues to hold the lever fully depressed.

Upon the release of the lever, which constitutes a control or an operating mechanism common to both the washer unit and the wiper unit, the recovery action of the bellows will then take a fresh charge of the liquid solvent from the reservoir 16 through the conduit 19, the direction of fluid flow being governed by a suitable interposed valve arrangement 39. The recovery action of the bellows during this solvent intaking stroke will act to return the rocker arm 22 to its normal position by means of which the wire element 28 of the Bowden unit will arrest the wiper unit. In this connection it will be noted that the initial movement of the rocker arm 22 toward its normal position has no effect upon the wiper control, the collar 30 remaining stationary in the slot 31 at this time until the seat 32 moves into a position for the wire element 28 and its collar 30 to spring thereinto. In fact, the upper end of the slot is so shaped as to direct the collar into its normally engaged seat. By retarding the recovery of the bellows the wiper action will be prolonged after the solvent spray has stopped.

In accordance with the present invention, the retardation of the bellows recovery is accomplished herein by means of a metering pin 40 carried on the inner side of the plunger part 36 for entering a chamber 41 formed in the tubular mounting stem 42 of the pump unit. This stem is swaged over the clamp member 44 at its inner end as at 43 to clamp the base flange 45 of the bellows upon the mounting bracket 20 with the aid of a nut 46 exteriorly threaded on the mounting stem 42. A second nut 46' is threaded on the stem to secure the latter in position on the firewall 46". The mounting stem is formed with a nipple 47 for engagement by the conduit or hose 19. The clearance about the metering pin 40 and the surrounding wall of the chamber 41 is predetermined and greater than the capacity of the orifice of nozzle 17 to permit free flow of the solvent from the bellows chamber 48 to the nozzle. The clearance, however, is such as to restrict the inflow of the solvent from the reservoir 16 to control the bellows recovery. At its swaged end the tube is counterbored at 49 to form a release chamber of increased clearance toward the end of the bellows recovery whereby to momentarily accelerate the pedal movement for shifting the wiper motor valve 9 quickly from its running position to its parked position. The metering pin 40 thereby functions to throttle the inflow solvent during the bellows recovery and until its free end is withdrawn into the release chamber 49 whereupon the accelerated recovery takes place for the valve shift. The metering pin further offers guiding support to the plunger 36 for insuring greatest efficiency in the displacement of the solvent.

In operation the lever or actuator 14 is depressed to start a spray of solvent from the nozzle 17 and concurrently therewith to set the wiper unit in operation as the rocker arm 22 moves upwardly to the broken line position of Fig. 2. During the initial portion of this rocker arm movement the shoulder or seat 32 will lift on the power transmitting connector 28 and telescope it within the armor 13 to move the control valve 9 to its running position. The anchorage 25, 26, 27 for the Bowden wire constitutes a means for effecting displacement of the collar 30 from the seat 32 after the control valve 9 has been so moved to its operative position to free the wiper unit from the rocker arm 22 while the washer actuating lever continues to be depressed to maintain the spray at the nozzle 17. Upon the release of the lever, the inherent resiliency of the bellows will start the pump on its intake stroke and concurrently initiate the return movement of the lever while the connection to the wiper control 9 idles within the slot 31. This idling action continues until the upper end of the slot 31 engages with the collar 30 to pull the connector 28 from its anchored armor to return the control valve 9 to its parked position. At this time the collar 30 is lodged within the seat 32 ready for the next depressive movement of the lever, but just prior to this engagement of the collar with its seat the restorative movement of the lever is momentarily accelerated to quickly shift the control valve from its running position to its parked position in order to prevent the wiper action slowing down during such shift.

Figs. 4 and 5 show a modified bellows in which the metering pin 40' has a sliding fit within the throttling chamber 41. For retarding the recovery action of the bellows 33' the metering pin is formed with a longitudinally extending groove 50 of a predetermined size to allow ample outflow of the liquid solvent from the bellows through the nozzles but to restrict the more rapid inflow to the bellows to impose a predetermined retarding effect on the bellows recovery. For accelerating the recovery as the free end of the pin withdraws from the throttling chamber 41 into the release chamber 49, the groove is enlarged at 51 to increase the capacity and augment the inflow for insuring the desired quick shift of the wiper control valve from its running position to its parked position.

Another modification is shown in Fig. 6 wherein a metering pin or valve 40" that is normally held off of its seat 52 on the end of the mounting stem 42" by a spring 53 carried by the plunger part 36" of the bellows. The floating valve 40" is formed with a restricted passage 54 of ample size to permit outflow of the liquid to the nozzle but of sufficient restriction to retard inflow until the spring 53 has spent its energy whereupon the spring will withdraw the valve from its seat to enlarge the capacity of the flow passage.

A still further modification is illustrated in Fig. 7 wherein the metering pin 40''' has a sliding fit within the throttling chamber 41, the clearance in this instance being provided through a bypass 55, the capacity of which is regulatable by an adjustable valve 56 threaded into the mounting stem 42'''. This serves to retard the recovery of the bellows 33''' until the metering pin withdraws from the throttling chamber 41 into the release chamber 49.

A further modification is illustrated in Fig. 8 wherein advantage is taken of the fact that the normal filling flow is much more rapid than the normal delivery flow which is always restricted by the small jet openings in the nozzle. No metering pin is employed to enter a throttling chamber but rather a fixed restriction is provided in the form of a passage 57 having a capacity at least as great as that of the nozzle jet openings.

A further point in consideration of the restrictive effect produced by a fixed restriction in the passage which is common to delivery and filling, and which would help to give a time delay during the filling stroke without impairment of delivery operation, resides in the fact that the delivery operation is accomplished under positive pressure produced by the foot and lever action initiating and causing the delivery of water, whereas, the refilling stroke is limited in the amount of available pressure differential, partly by the recovery spring that is resident in the construction of the self-refilling bellows, and still further limited by the fact that the pressure for the refilling operation comes from that of the atmosphere which can never be greater than indicated by a barometer at the place where the device is functioning. The passage 57 has a predetermined minimum restrictive value and may be adjusted by a throttling needle valve 56' in the bypass 55' to accomplish the desired amount of time delay on the filling without introducing any appreciable retard to the outflow of liquid during the delivery stroke.

In the preceding description of the embodiments disclosed in Figs. 1 through 7, attention has been drawn to the automatic means for removal of the restriction during the final part of the filling movement of the bellows. It has also been explained that this is for the purpose of providing a rapid motion to the control for the windshield wiper motor, in order to give it a positive and sudden operation for parking of the motor. The modification disclosed in Fig. 8 does not make provision for this automatic removal of restriction and it, therefore, will not provide for the sudden movement of the windshield wiper motor control. This modification is introduced here, however, in recognition of the fact that the windshield wiper control mechanism will operate and will function fully without this sudden movement for its control parts.

From the foregoing it will be noted that the improved washer pump embodies a coordinating construction which, in effect, converts the washer pump into a coordinator having a time delay action. The invention is not confined to the foot actuated type of washer alone but is applicable to other power operated types. In other words, the plunger could be slidable within a cylinder and carry its throttling stem for retarding its intake stroke before absorbing the play in a lost motion connection to the control of the wiper unit.

In all embodiments described an early joint action of the washer and wiper units is obtained, the washer remaining active for a predetermined period, and the wiper unit continuing thereafter to prolong the sole operation of the wipe runit. The pump construction has been simplified to provide one that is economical in construction and in installation.

The windshield clearing system automatically starts the wiper unit for conjoint action with the washer unit and extends the wiping operation beyond the washing cycle for a predetermined time interval and thereafter sets up a sub-cycle of operation for parking the wiper. This sub-cycle of operation herein occurs during the return stroke and as a part thereof, the washer being first conditioned for subsequent liquid ejection during the first part of the return stroke and this is followed by a separate and distinct parking operation.

The windshield wiper unit 5, 9 may be of the type disclosed in the recently issued Patent 2,617,136 wherein the control is slidable or shiftable from a running position to a parking position to reverse the power or port connections for arresting the wiper in a predetermined position, or the control may be shifted from its wiper parking position to the wiper running position for stroking the wiper back and forth across the windshield.

The foregoing description has been given in detail for the purpose of clarity and not by way of limitation since the teachings of the present invention are capable of assuming other physical embodiments without departing from the spirit of the invention and the scope of the appended claims.

What is claimed is:

1. A windshield cleaner comprising a wiper unit and a washer unit, the wiper unit having a motor and a control therefor, the washer unit having a pump with a washing cycle and a refilling cycle and an actuator control therefor, means operatively connecting the controls for joint operation of both units during initial movement of said actuator control on a washing cycle, and means operable during the initial portion of the washing cycle for subsequently freeing the wiper unit from the actuator control and so holding the wiper unit free until near the end of the refilling cycle.

2. A windshield cleaner comprising a wiper unit and a washer unit, the wiper unit having a motor and a control therefor, the washer unit having a pump with a delivery stroke and an intake stroke and a lever actuator therefor for effecting the delivery stroke thereof, and means operatively connecting the actuator to the wiper motor control for actuation of the latter by the former for conjoint operation of said units automatically during the initial delivery stroke movement of the actuator to start the wiper unit in operation, said means including means automatically operable to free the wiper unit control from the actuator while the latter continues its movement for maintaining the washer unit operative with the wiper unit.

3. A windshield cleaner comprising a wiper unit and a washer unit, the wiper unit having a motor and a control therefor, the washer unit having a pump and an actuator therefor for providing an active delivery stroke for the pump, the pump having a self-return intake stroke for restoring the actuator to a normal position, and means maintaining an operative connection between the control and the actuator when the latter is in its normal position to start the wiper unit automatically during the initial movement of the actuator on the pump delivery stroke and to arrest the wiper unit automatically adjacent the end of the intake stroke, said last-named means including means to enable independent operation of the actuator during the remainder of the delivery stroke and the major portion of the intake stroke.

4. A windshield clearing system comprising a cleaner unit and a washer unit, the cleaner unit having a motor and a control therefor, the washer unit having a pump with a self-return fluid displacing member operating with an intake stroke and a delivery stroke, the pump being in fluid communication with a reservoir and with a nozzle for transferring liquid from the former to the latter for delivery into the path of a wiper associated with the cleaner unit, and a lever actuator means functioning conjointly by a single movement thereof for actuation of the pump and operation of the wiper control to set the wiper in operation on the delivery stroke of the pump and to arrest the cleaner unit automatically when the intake stroke of the pump is approaching its completion.

5. A windshield clearing system comprising a wiper unit and a washer unit, the wiper unit having a motor and a control therefor, the washer unit having a reservoir, a nozzle, a pump and a lever actuator for the latter, said lever actuator being arranged for swinging pressure contact on a moving part of the pump, the pump having fluid communication with the reservoir and with the nozzle for intaking liquid on one stroke and delivering liquid into the path of the wiper on a return stroke, said actuator being driven by the pump on its intake stroke, means for throttling the inlet communication to the pump for retarding its intake stroke until the pump approaches the end thereof, and means connecting the actuator to the wiper unit control for setting the wiper in operation at the start of the delivery stroke of the pump and for arresting the wiper unit adjacent the end of the retarded intake stroke of the pump.

6. A windshield clearing system comprising a wiper unit and a washer unit, the wiper unit having a motor and a control therefor, the washer unit having a pump with a delivery stroke and a self-returned intake stroke, a depressible actuator operable to effect a liquid delivery by the pump on its delivery stroke and returnable by the pump on its intake stroke, means connecting the actuator to the wiper unit control for setting the motor in operation on the delivery stroke of the pump and for arresting the wiper unit on the nearly completed intake stroke of the pump, and throttle means for impeding the liquid inflow communication to the pump to retard the intake stroke only until it is nearly completed.

7. A windshield clearing system comprising a wiper unit and a washer unit, the wiper unit having a motor and a control therefor, the washer unit having a pump with a delivery stroke and a self-returned intake stroke, an actuator depressible to actuate the pump on its delivery stroke and returnable by the pump on its intake stroke, means connecting the actuator to the wiper unit control for setting the motor in operation on the delivery stroke of the pump and for arresting the wiper unit at or near the completion of the intake stroke of the pump, said pump being in the form of a bellows having a plunger part carrying a metering pin, and a liquid flow passage arranged to receive the metering pin with a predetermined clearance to retard the intake stroke, and so positioned that the metering pin will be withdrawn from said liquid flow passage shortly before said bellows with its plunger part reaches the end of its intake stroke movement.

8. A windshield clearing system comprising a wiper unit and a washer unit, the wiper unit having a self-parking motor and a control therefor, the washer unit having an expansible pump chamber collapsible on a delivery stroke and expansible on an intake stroke, said pump having a plunger part carrying a metering pin and a liquid flow passage arranged to receive the metering pin with a predetermined clearance to retard the intake stroke until the intake stroke approaches the end of its travel, a foot actuator depressible to collapse the pump chamber on its delivery stroke and returnable to a normal position by and upon expansion of the pump chamber on its intake stroke as determined by the metering pin, the liquid flow passage having a portion of greater clearance to accelerate the return movement of the foot actuator for parking the wiper unit.

9. A windshield cleaner comprising a wiper unit and a washer unit, the wiper unit having a motor and a control therefor, the washer unit having a pump and an actuator therefor, the pump having a discharge stroke and an intake stroke, the actuator having a rocker arm formed with a slot having an offset seat at one end, a power transmitting flexible member connected at one end to the control of the wiper unit and having its opposite end operatively engaged in the slot for being pulled by the rocker arm in one direction of movement to turn the wiper unit off, means supporting the flexible member substantially tangential to the path of movement of the slotted portion of the rocker arm to subject the member to lateral stress for displacing it from the offset seat during movement of the rocker arm in the opposite direction after initially starting the wiper unit in operation and thereafter to idle with respect to the wiper unit as the actuator is continued to maintain the operation of the washer unit.

10. A washer unit to be used in association with a wiper unit having a control, said washer unit comprising a self-expanding bellows having a fluid inlet passage forming a throttling chamber, said bellows having a liquid displacing wall opposing the throttling chamber and carrying a metering pin for moving thereinto upon collapsing of the bellows, said metering pin restricting the chamber for retarding the inflow of liquid into the expanding bellows after its collapse until the said metering pin has been withdrawn from its throttling position in said throttling chamber, and an actuator for collapsing the bellows and having means of attachment to such a control for regulating a wiper unit.

11. A washer unit to be used in association with a wiper unit having a control, said washer unit comprising a bellows having a fluid passage forming a throttling chamber, said bellows having a liquid displacing wall opposing the chamber and carrying a metering pin for moving therein upon collapsing the bellows, said metering pin restricting the chamber for retarding the inflow of liquid into the expanding bellows after its collapse, and an actuator for collapsing the bellows and having means of attachment to such a control for regulating a wiper unit, said chamber having an enlarged portion forming a release chamber into which the metering pin is withdrawable by the wall to accelerate the expansive action of the bellows as it approaches its normal expanded shape.

12. A windshield cleaner comprising a wiper unit and a washer unit, the wiper unit having a motor and a control therefor, the washer unit having a pump with a washing cycle and a refilling cycle and an actuator control therefor, means operatively connecting the controls for joint operation of both units, and means operable during the initial portion of the washing cycle for freeing the wiper unit from the actuator control and so holding the wiper unit free until near the end of the refilling cycle, said last-named means including automatic means for reestablishing the connecting means for joint operation of both units in the next washing cycle.

13. A windshield clearing system comprising a cleaner unit and a washer unit, the cleaner unit having a motor and a control therefor, the washer unit having a pump with a self-return fluid displacing member operating with an intake stroke and a delivery stroke, the pump being in fluid communication with a reservoir and with a nozzle for transferring liquid from the former to the latter for delivery into the path of a wiper associated with the cleaner unit, and actuator means common to both the control and the pump and operable by a single movement thereof to set the wiper in operation on the delivery stroke of the pump and to arrest the cleaner unit automatically near the completion of the intake stroke of the pump.

14. A windshield cleaning system comprising a wiper unit and a washer unit, the wiper unit having a motor and a control therefor, the washer unit having a pump with a delivery stroke and a self-return intake stroke, a depressible actuator to effect a liquid delivery by the pump on one stroke and returnable by the pump on its intake stroke, means connecting the actuator to the wiper unit control for setting the motor in operation automatically on the delivery stroke of the pump and for arresting the wiper unit automatically when the intake stroke of the pump is nearly completed, and throttle means for impeding the liquid inflow communication to the pump to retard its intake stroke.

15. A windshield clearing system comprising a cleaner unit and a washer unit, the cleaner unit having a motor and a control therefor, the washer unit having a pump with a fluid displacing member operating on intake and delivery strokes to cause fluid flow, the pump being in communication with a liquid holding reservoir and with a nozzle for transferring liquid from the former to the latter for delivery into the path of a wiper associated with the cleaner unit, means for throttling the inlet communication to the pump to retard the intake stroke, and pump actuator means movable back and forth and operable automatically to set the wiper in operation on the delivery stroke of the pump and to arrest the cleaner unit following a retarded intake stroke movement of the pump member.

16. A windshield clearing system comprising a cleaner unit and a washer unit, the cleaner unit having a motor and a control therefor, the washer unit having a pump with a fluid displacing member operating on intake and delivery strokes to cause fluid flow, the pump being in communication with a liquid holding reservoir and with a nozzle for transferring liquid from the former to the latter for delivery into the path of a wiper associated with the cleaner unit, the pump on its intake stroke having a wiper running position followed by a wiper parking position, and wiper arresting means operable during movement of the pump into such wiper parking position to arrest the wiper at a predetermined position.

References Cited in the file of this patent

UNITED STATES PATENTS

| | | |
|---|---|---|
| 2,206,814 | Horton | July 2, 1940 |
| 2,702,918 | Neufeld | Mar. 1, 1955 |
| 2,724,855 | Olin | Nov. 29, 1955 |

FOREIGN PATENTS

| | | |
|---|---|---|
| 1,082,258 | France | June 16, 1954 |